(12) United States Patent
Kraeling et al.

(10) Patent No.: US 10,556,607 B2
(45) Date of Patent: Feb. 11, 2020

(54) SYSTEMS AND METHOD FOR A VEHICLE NETWORK

(71) Applicant: GE Global Sourcing LLC, Norwalk, CT (US)

(72) Inventors: Mark Bradshaw Kraeling, Melbourne, FL (US); Patricia Sue Lacy, Lawrence Park, PA (US)

(73) Assignee: GE GLOBAL SOURCING LLC, Norwalk, CT (US)

( * ) Notice: Subject to any disclaimer, the term of this patent is extended or adjusted under 35 U.S.C. 154(b) by 0 days.

(21) Appl. No.: 16/243,778

(22) Filed: Jan. 9, 2019

(65) Prior Publication Data

US 2019/0144022 A1 May 16, 2019

Related U.S. Application Data

(63) Continuation of application No. 15/135,180, filed on Apr. 21, 2016, now Pat. No. 10,207,727.

(60) Provisional application No. 62/159,952, filed on May 11, 2015.

(51) Int. Cl.
*B61L 25/02* (2006.01)
*B61L 15/00* (2006.01)
*H04L 12/40* (2006.01)

(52) U.S. Cl.
CPC ......... *B61L 25/028* (2013.01); *B61L 15/0036* (2013.01); *B61L 15/0072* (2013.01); *H04L 12/40169* (2013.01); *H04L 2012/40273* (2013.01); *H04L 2012/40293* (2013.01)

(58) Field of Classification Search
CPC ............... B61L 25/028; B61L 15/0036; B61L 15/0072; H04L 12/40169; H04L 2012/40293; H04L 2012/40273
See application file for complete search history.

(56) References Cited

U.S. PATENT DOCUMENTS

| H001961 H | * | 6/2001 | Runyon |
| 2006/0180709 A1 | * | 8/2006 | Breton ................ B61L 15/0036 246/1 C |
| 2015/0134156 A1 | * | 5/2015 | Henry ..................... B61C 17/12 701/19 |

(Continued)

FOREIGN PATENT DOCUMENTS

WO    2014188487    11/2014

OTHER PUBLICATIONS

Examination report No. 1 dated Dec. 12, 2018 for corresponding Australian Application No. 2018200544 (4 pages).

*Primary Examiner* — Thomas Ingram
(74) *Attorney, Agent, or Firm* — Christopher R. Carroll; The Small Patent Law Group, LLC

(57) ABSTRACT

A system is provided having a vehicle. The vehicle includes a chassis, and a first network bus extending from internally in the chassis to a first network port attached externally to the chassis at a first side of the vehicle. The vehicle includes a second network bus extending from internally in the chassis to a second network port attached externally to the first chassis at a second side of the vehicle. The first network bus has a first electrical configuration and the second network bus has a second electrical configuration that is different than the first electrical configuration.

20 Claims, 2 Drawing Sheets

(56) References Cited

U.S. PATENT DOCUMENTS

2015/0358199 A1* 12/2015 Komura .................. B60L 1/003
709/226
2017/0036660 A1* 2/2017 Humphrey ............ B60T 17/228

\* cited by examiner

US 10,556,607 B2

SYSTEMS AND METHOD FOR A VEHICLE NETWORK

CROSS-REFERENCE TO RELATED APPLICATIONS

This application is a continuation of U.S. patent application Ser. No. 15/135,180, filed 21 Apr. 2016 (now U.S. Pat. No. 10,207,727), which claims priority to U.S. Provisional Application No. 62/159,952, filed on 11 May 2015. The entire disclosures of these applications are incorporated herein by reference.

FIELD

Embodiments of various embodiments herein relate to vehicle control. Other embodiments relate to vehicle control based on a determined vehicle orientation.

BACKGROUND

A vehicle "consist" is a group of two or more vehicles that are coupled or linked together to travel along a route. The vehicles may be logically linked (e.g., coordinated wireless control), or they may be mechanically linked by way of couplers, hitches, or the like. In certain vehicle consists, it may be the case that the vehicles are coupled in different orientations, that is, the vehicles are oriented differently from one another such that they face different directions. Especially in cases where the vehicles are configured to operate bi-directionally (e.g., forwards and backwards), it may be necessary to determine how the vehicles are oriented, prior to the consist moving, to avoid situations (for example) where one vehicle is motoring in one direction and a linked vehicle is motoring in the opposite direction.

As one example, in a consist of locomotives or other rail vehicles, control inputs of a control subsystem of the consist (e.g., distributed power control) may include the respective orientations of the rail vehicles in the consist relative to a lead vehicle of the consist and/or a direction of travel of the consist. In a rail context, such orientations may include "short hood forward" (e.g., operator cab or front end of the vehicle is facing the lead vehicle and/or direction of travel) or "long hood forward" (e.g., operator cab or front end of the vehicle is facing away from the lead vehicle or direction of travel). Further information about rail vehicle orientation, and control schemes relating thereto, are found in U.S. Pat. No. 6,490,523, issued Dec. 3, 2002, and in U.S. Publication No. 2009/0248226, dated Oct. 1, 2009, both of which are incorporated by reference herein in their entireties.

Existing systems for determining vehicle orientation involve either manual data entry (e.g., an operator determining the orientation of each vehicle and entering data into a control subsystem) or complex signaling or communication schemes. The former is time consuming and prone to error, and the latter may add significant complexity and cost to a vehicle. Therefore, it may be desirable to provide a vehicle, system, and method of vehicle control that differ from existing systems and methods.

BRIEF DESCRIPTION

In an embodiment, a vehicle includes a chassis, a first network bus, and a second network bus. The first network bus extends from internally in the chassis (e.g., at a location where a network circuit may be connected to the bus) to a first network port attached externally to the chassis. The first network port is positioned in association with a first orientation of the vehicle, e.g., the front end of the vehicle. The second network bus extends from internally in the chassis to a second network port attached externally to the chassis. The second network port is positioned in association with a different, second orientation of the vehicle, e.g., the rear end of the vehicle. The first network bus has a first electrical configuration and the second network bus has a second electrical configuration that is different than the first electrical configuration.

According to an alternative embodiment, having different electrical configurations in association with the different orientations allows a control subsystem of an adjacent vehicle, when coupled to the first network bus or the second network bus (e.g., by way of a detachable network cable that extends between the vehicles), to determine how the vehicles are oriented relative to one another. For example, the control subsystem may include a network circuit that is configured to determine the electrical configurations of network buses attached to it. Based on the determined electrical configuration in a given instance, the control subsystem can determine the vehicle orientation.

As one example, the network buses may be Ethernet cables or other Ethernet buses, and the networks ports may be Ethernet ports. (The buses are used, in conjunction with routers, hubs, switches, or other network circuits, to communicate data, e.g., for vehicle control purposes.) One of the Ethernet buses is configured in an Ethernet crossover configuration, and the other is configured in an Ethernet straight-through configuration. Plural vehicles in a transportation system may be similarly configured, for example, in each vehicle an Ethernet crossover bus extends to an Ethernet port at the front or rear of the vehicle, and an Ethernet straight-through bus extends to an Ethernet port at the other of the front or rear of the vehicle. Whenever one vehicle is coupled to an adjacent vehicle for network data communications, the one vehicle can determine which end of the adjacent vehicle is attached to it by determining the presence of the Ethernet crossover bus or the Ethernet straight-through bus.

BRIEF DESCRIPTION OF THE DRAWINGS

The detailed description will be better understood from reading the following description of non-limiting embodiments, with reference to the attached drawings, wherein below.

DETAILED DESCRIPTION

Figure 1:
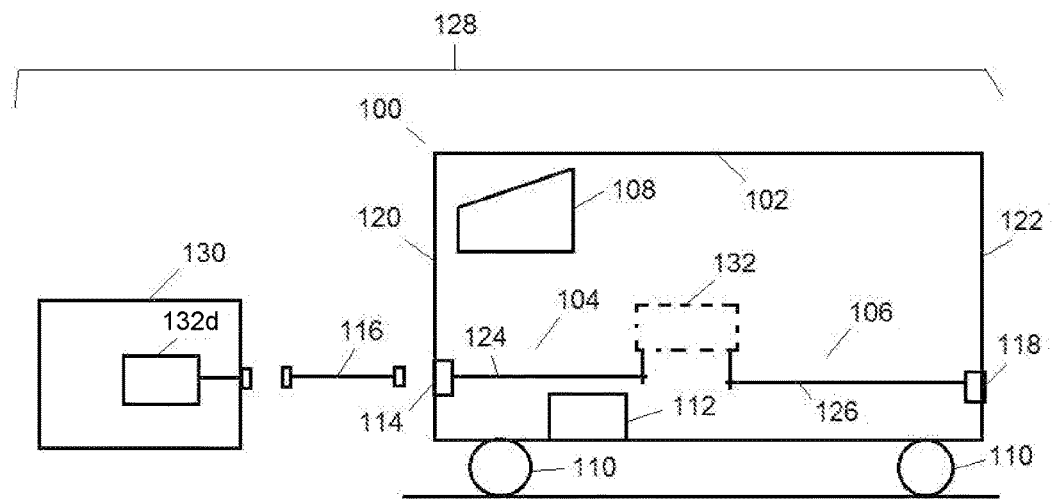
FIG. 1 is a schematic diagram of a vehicle network system, in accordance with an embodiment.

The following detailed description of certain embodiments will be better understood when read in conjunction with the appended drawings. To the extent that the figures illustrate diagrams of the functional modules of various embodiments, the functional blocks are not necessarily indicative of the division between hardware circuitry. Thus, for example, one or more of the functional blocks (e.g., processors or memories) may be implemented in a single piece of hardware (e.g., a general-purpose signal processor or a block of random access memory, hard disk, or the like). Similarly, the programs may be stand-alone programs, may be incorporated as subroutines in an operating system, may be functions in an installed software package, and the like. It should be understood that the various embodiments are not limited to the arrangements and instrumentality shown in the drawings.

In various embodiments, a plurality of vehicles within a transportation network (e.g., automobiles that travel along a road system, or rail vehicles that travel throughout a network of track) are outfitted with onboard data networks. Each vehicle includes respective first and second externally-accessible network busses for detachably connecting the network buses to adjacent vehicles for inter-vehicle data communications. The first network buses have one electrical configuration and are associated with one common or corresponding orientation of the vehicles (e.g., front end or rear end). The second network buses have a different electrical configuration and are associated with a different common or corresponding orientation of the vehicles (e.g., the other of the front or rear end). Each vehicle also includes a control subsystem having a network circuit. The network circuit is connected to the vehicle's network buses, and is configured, when the vehicle is coupled to an adjacent vehicle for data communications, to determine the electrical configuration of the adjacent vehicle's network bus to which the network circuit is coupled. Based on the determined electrical configuration, the control subsystem can determine how the adjacent vehicle is oriented, such as which end of the adjacent vehicle is attached.

FIG. 1 is a schematic block diagram of a vehicle network system 128. The vehicle network system 128 may include one or more vehicles 100. The vehicle 100 includes a chassis 102, a first network bus 104, and a second network bus 106. The chassis 102 is a frame and/or body for supporting the components of the vehicle, which can include an operator cab 108, wheels 110, a propulsion system 112 (e.g., one or more engines, motors, alternators, generators, brakes, batteries, turbines, and/or the like), and/or the like. Optionally, the vehicle 100 may be a marine vessel. For example, the chassis may be or include a hull of the marine vessel.

Each of the network buses 104 and 106 may include one or more electrical conductors for communicating network data along the respective network bus 104, 106. The network data may include data configured in packet form (e.g., data packets that comprise respective sets or frames of associated data bits, and/or the like) and that may be addressed to one or more recipient devices or vehicles 100 within the vehicle control subsystem 128.

Additionally or alternatively, the first and second network buses 104 and 106 may each include a plurality of electrical conductors. For example, the network buses 104 and 106 may be Ethernet buses (e.g., according to the 10 BASE-T, 100 BASE-T, 1000 BASE-T, 10 GBASE-T, and/or the like Ethernet standards) each having eight respective electrical conductors, such as Ethernet cables (e.g., category 5e (cat 5E) cables, category 6 (cat 6) cables, category 6a (cat 6a) cables, and/or the like). In various embodiments, the first network bus 104 is configured having a first electrical configuration 124 (shown in FIG. 3), and the second network bus 106 is configured having a second electrical configuration 126 (shown in FIG. 4) that is different than the first electrical configuration.

The first network bus 104 extends internally within the chassis 102 from a network circuit 132 to a first network port 114. The first network bus 104 is operably attached to the first network port 114. For example, the first network bus 104 may be electrically coupled to the first network port 114. The first network port 114 may be attached externally to the chassis. For example, the first network port 114 is configured to be accessible from outside the vehicle 100. Additionally or alternatively, the first network port 114 may be built into and/or disposed on an external surface of the chassis 102. For example, an external network cable 116 can be operably attached to the first network port 114 without having to run the external network cable 116 inside the vehicle 100. Optionally, the first network port 114 may include a flap, cover, removable plug insert, and/or the like for preventing an ingress of foreign contaminants into the first network port 114 when the external network cable 116 is not operably attached to the first network port 114.

The second network bus 106 extends internally within the chassis from the network circuit 132 to a second network port 118. The second network bus 106 is operably coupled to the second network port 118. The second network port 118 may be attached externally to the chassis 102 similar to and/or the same as the first network port 114. It may be noted, that the first network port 114 is positioned at a first orientation 120 of the vehicle 100, and the second network port 118 is positioned at an opposing or different, second orientation 122 of the vehicle 100.

The first and second orientations 120, 122 may include first and second different sides of the vehicle 100 (e.g., front end and rear end, left side and right side, and/or the like). Additionally or alternatively, in embodiments when the vehicle 100 correspond to a rail vehicle, the first and second orientations 120, 122 may include long hood forward and short hood forward. In another example, in embodiments when the vehicle 100 correspond to a marine vessel, the first and second orientations 120, 122 may include bow and stern.

The vehicle 100 includes the network circuit 132. The network circuit 132 may include or represent one or more hardware circuits or circuitry that include, are connected with, or that both include and are connected with one or more processors, controllers, or other hardware logic-based devices. The network circuit 132 may be operably coupled to the first network port 114 by the first network bus 104, and the second network port 118 by the second network bus 106. In various embodiments, the network circuit 132 may be configured to pass through network data between the first network port 114 and the second network port 118. Additionally or alternatively, the network circuit 132 configured as described herein, may function as a router transceiver unit as described in U.S. Pat. No. 8,532,850, issued Sep. 10, 2013 and incorporated by reference herein in its entirety, for carrying out network communications over an MU cable bus.

Optionally, the first and second network buses 104, 106 may terminate inside the chassis 102 at a common location, for operable coupling of the buses to the same network circuit 132. Alternatively, the network buses 104, 106 may terminate inside the chassis 102 at different locations, for operable coupling to different network circuits (e.g., the network circuits 132*a*, 132*b*, 132*c*, 132*d*). Additionally or alternatively, the network circuit 132 may be connected to only one of the network ports 114, 118. For example, the vehicle 100 may be a leading vehicle within a consist that is coupled to one vehicle.

Figure 2:
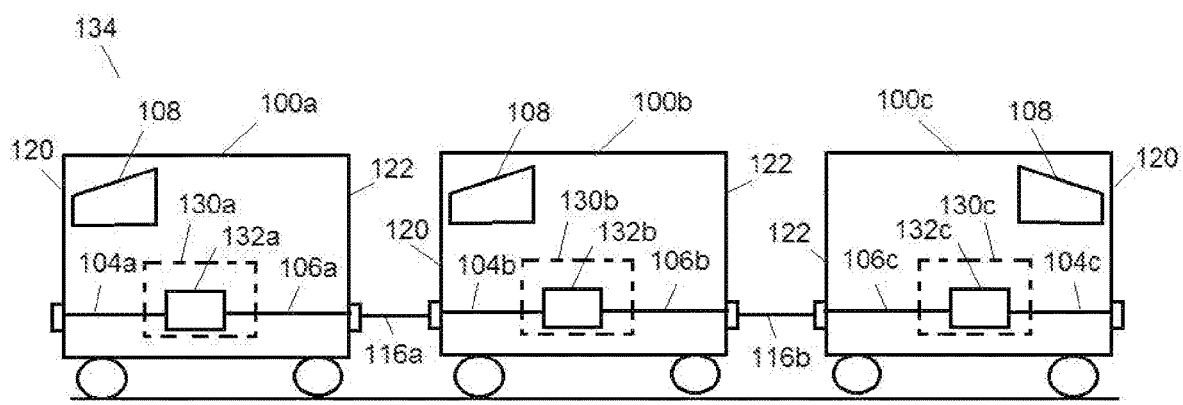
FIG. 2 is a schematic diagram of a vehicle network system, in accordance with an embodiment.

Additionally or alternatively, the network circuit 132 may be part of a control subsystem 130 of the vehicle network system 128. The control subsystem 130 may include or represent one or more hardware circuits or circuitry that include, are connected with, or that both include and are connected with one or more processors, controllers, or other hardware logic-based devices. In connection with FIG. 1, the control subsystem 130 includes the network circuit 132*d* configured for operable attachment to the first and second network ports 114, 118. It may be noted that the functions and/or operations performed by the network circuit 132*d* may be similar to and/or the same as the network circuit 132. The control subsystem 130 may be disposed in another vehicle within the vehicle network system 128, a stationary remote system (e.g., dispatch facility), and/or the like with the network circuit 132*d* being configured to be connected to the ports 114, 118 by way of the external network cable 116. The external network cable 116 may include one or more electrical conductors for communicating network data between the vehicle 100 and the network circuit 132*d*. For example, the external network cable 116 may include an Ethernet bus (e.g., according to the 10 BASE-T, 100 BASE-T, 1000 BASE-T, 10 GBASE-T, and/or the like Ethernet standards) each having eight respective electrical conductors. Optionally, the network circuit 132*d* of the control subsystem 130 may be operably coupled to the external network cable 116 utilizing an internal network bus (e.g., similar to and/or the same as the network buses 104, 106 as shown in FIG. 2) and/or a network port (e.g., similar to and/or the same as the network ports 114, 118).

The network circuit 132*d* is configured, when connected to the first network port 114 and/or the second network port 118, to determine the first electrical configuration 124 (shown in FIG. 3) and/or the second electrical configuration 126 (shown in FIG. 4), respectively of the network buses 104, 106. That is, the network circuit 132*d* is configured to sense or detect the electrical configuration of the network bus 104, 106 to which the network circuit 132*d* is currently coupled (for data communications) by way of the first network port 114 and/or the second network port 118. For example, the network circuit 132*d* may be configured to detect the electrical configuration of the network bus 104, 106 coupled to the first network port 114 and/or second network port 118, respectively, as shown in the U.S. Pat. No. 6,175,865, issued Jan. 16, 2001, which is incorporated herein by reference in its entirety. Additionally or alternatively, the network circuit 132*d* may execute an algorithm to determine the electrical configuration of the network bus 104, 106. For example, the network circuit 132 may be configured to execute an Auto MDI-X algorithm and/or be capable of Auto MDI-X. Optionally, the Auto MDI-X algorithm may incorporate aspects of U.S. Pat. No. 6,175,865. For example, the network circuit 132*d* may determine the electrical configuration of the network bus 104, 106 based on detection and/or status of an RMII register corresponding to performance of the MDI-X in a crossover or straight-through mode.

Additionally or alternatively, the network circuit 132*d* may include dedicated ports corresponding to an orientation of the adjacent vehicle. For example, the network circuit 132*d* may include two ports corresponding to the first orientation 120 and the second orientation 122. The network circuit 132*d* may determine the electrical configuration of the coupled network bus 104, 106 based on the port the external network cable 116 is coupled to. Optionally, the network ports 114, 118 may include two ports corresponding to an orientation of the adjacent vehicle. For example, the network ports 114, 118 may include a port corresponding to the first orientation 120 of the adjacent vehicle and/or a second port corresponding to the second orientation 122 of the adjacent vehicle.

The control subsystem 130 is configured to determine an orientation of the vehicle 100 relative to the control subsystem 130 based on the detected or sensed electrical configuration (e.g., the first electrical configuration 124, the second electrical configuration 126). For example, the control subsystem 130 determines whether the vehicle 100 is oriented at the first orientation 120 or the second orientation 122 relative to the control subsystem 130 (e.g., relative to an adjacent vehicle in which the control subsystem is disposed) based on the detected or sensed electrical configuration. That is, since the different electrical configurations (e.g., the first electrical configuration 124, the second electrical configuration 126) of the two buses 104, 106 correspond to the different orientations 120, 122 of the vehicle 100, the control subsystem 130 can determine the first orientation 120 or second orientation 122 based on the sensed or detected electrical configuration.

Optionally, the control subsystem 130 may include a vehicle controller (not shown), which is configured to control the vehicle 100, for example, for movement along a route. The control subsystem 130 may control the vehicle 100, the vehicle consist in which the vehicle 100 is a part, and/or an onboard electronic device of the consist based on the determined relative orientation. For example, if a lead vehicle is facing with its front end facing the direction of travel, and an adjacent vehicle is in effect backwards, with its rear end facing the rear end of the lead vehicle, then the control subsystem 130 may control a device to ensure that the adjacent vehicle is in effect motoring in reverse, e.g., motoring in the same direction as the lead vehicle but which is opposite the direction which the front end of the adjacent vehicle is facing.

Additionally or alternatively, in connection with FIG. 2 a plurality of vehicles (e.g., 100*a*, 100*b*, 100*c*) in a transportation network are configured similarly to and/or the same as the vehicle 100 shown in FIG. 1.

Figures 3, 4:
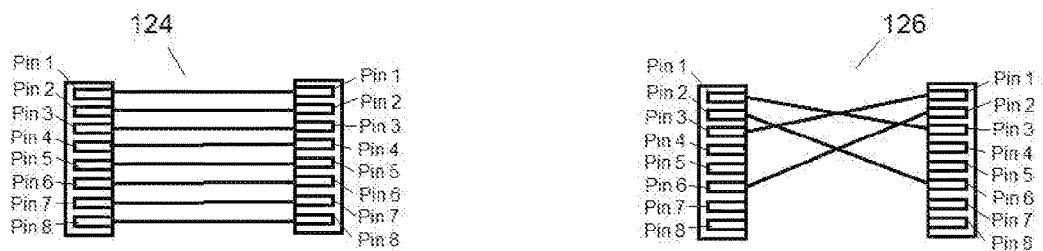
FIG. 3 is a schematic diagram of an electrical configuration of a network bus, in accordance with an embodiment.
FIG. 4 is a schematic diagram of an electrical configuration of a network bus, in accordance with an embodiment.

FIG. 2 is a schematic diagram of a vehicle network system 134, in accordance with an embodiment. The system 134 includes a first vehicle 100*a*, a second vehicle 100*b*, and a third vehicle 100*c*. Optionally, the system 134 may include two vehicles or more than three vehicles. For example, in a given transportation system, the system could include hundreds or thousands of vehicles. The vehicles 100*a*, 100*b*, 100*c* include respective externally-accessible first network buses 104*a*, 104*b*, 104*c* associated with a corresponding first orientation 120 of the vehicles and respective externally-accessible second network buses 106*a*, 106*b*, 106*c* associated with a different corresponding second orientation 122 of the vehicles. For example, the first network buses 104*a*, 104*b*, 104*c* have the first electrical configuration 124 (FIG. 3), and the second network buses 106*a*, 106*b*, 106*c* have the different, second electrical configuration 126 (FIG. 4). It may be noted that although embodiments are illustrated herein showing the vehicles 100*a*, 100*b*, 100*c* with two network buses (e.g., the first network buses 104*a*, 104*b*, 104*c*, the second network buses 106*a*, 106*b*, 106*c*) with different electrical configurations 124, 126 associated with the two different orientations 120, 122 of the vehicles 100*a*, 100*b*, 100*c*, a vehicle in at least one embodiment may include three or more such network buses respectively associated with three or more different orientations of the vehicle.

FIGS. 3-4 are schematic diagrams of the electrical configurations 124-126 of the network buses 104, 106, in accordance with an embodiment. For example, the electrical configuration 124 shown in FIG. 3 corresponds to a pattern and/or arrangement of conductor pins with respect to each other of opposing ends of the first network buses 104a, 104b, 104c and/or at the first network port 114, and the electrical configuration 126 shown in FIG. 4 correspond to a pattern and/or arrangement of conductor pins with respect to each other of opposing ends of the second network buses 106a, 106b, 106c and/or at the second network port 118.

The electrical configuration 124 may correspond to an Ethernet straight-through configuration as illustrated in FIG. 3. The Ethernet straight-through configuration is one in which the pinout corresponding to an arrange of conductor pins of one end of the bus matches the pinout of the other end of the bus. For example, the first network buses 104a, 104b, 104c may be Ethernet buses having an Ethernet connector (e.g., RJ-45, and/or the like) coupled at opposing or terminating ends of each of the first network bus 104a, 104b, 104c. The first network buses 104a, 104b, 104c, configured as an Ethernet straight-through configuration, may have the pinouts of each opposing Ethernet connector match. For example, pin 1 of a first Ethernet connector connected to a first end of the first network bus 104a is coupled (via a first wire of the cable) to pin 1 of the second Ethernet connector connected to a second opposing end of the first network bus 104a.

The electrical configuration 126 may correspond to an Ethernet crossover configuration as illustrated in FIG. 4. The Ethernet crossover configuration is one in which the pinout of one end of the bus does not match the pinout of the other end of the bus. For example, the second network buses 106a, 106b, 106c may be Ethernet buses having an Ethernet connector (e.g., RJ-45, and/or the like) coupled at opposing or terminating ends of each of the second network bus 106a, 106b, 106c. The second network buses 106a, 106b, 106c, configured as an Ethernet crossover configuration, may have the pinouts corresponding to an arrange of conductor pins of each opposing Ethernet connector not match. For example, pins 1 and 2 of a first Ethernet connector connected to a first end of the second network bus 106a is coupled (via a first wire of the cable) to pins 3 and 6, respectively, of the second Ethernet connector connected to a second opposing end of the second network bus 106a, and vice versa. It may be noted further information on Ethernet straight-through and crossover configurations can be found in the aforementioned U.S. Pat. No. 6,175,865.

In further reference to FIG. 2, the system 134 may further include a plurality detachable network cables 116a, 116b operably interconnecting the network buses (e.g., the first network buses 104a, 104b, 104c, the second network buses 106a, 106b, 106c) of adjacent ones of the vehicles 100a, 100b, 100c. For example the detachable network cables 116a may operably interconnect the network buses of the first and second vehicles 100a, 100b, and the detachable network cables 116b may operably interconnect the network buses of the second and third vehicles 100b and 100c.

The vehicles 100a, 100b, 100c may further comprise respective control subsystems 130a, 130b, 130c. Each of the control subsystems 130a, 130b, 130c have respective network circuits 132a, 132b, 132c that are operably coupled to the first network buses 104a, 104b, 104c and the second network busses 106a, 106b, 106c internally to the vehicles 100a, 100b, 100c. The network circuits 132a, 132b, 132c (e.g., similar to and/or the same as the network circuits 132, 132d) are configured to detect and/or determine the first electrical configuration 124 or the second electrical configuration 126 of the network buses of adjacent vehicles 100a, 100b, 100c that are adjacent to the vehicle 100a, 100b, 100c in which the network circuit 132a, 132b, 132c is disposed and connected to by way of the detachable network cables 116a, 116b.

For example, as shown in FIG. 2, the second vehicle 100b is interposed between the first vehicle 100a and the third vehicle 100c. The first orientations 122 of the first vehicle 100a and the third vehicle 100c are facing and/or directed towards the second vehicle 100b. The network circuit 132b of the second vehicle 100b is operably connected to the second network bus 106a of the first vehicle 100a by way of the first network bus 104b of the second vehicle 100b and the first detachable network cable 116a. Additionally, because the third vehicle 100c is oriented opposite relative to the first vehicle 100a (in this example), the network circuit 132b is operably connected to the third vehicle 100c by way of the second network bus 106b of the second vehicle 100b and the second detachable network cable 116b. The network circuit 132b is configured to determine the electrical configuration (e.g., the first configuration 124, the second configuration 126) of the bus (e.g., the second network bus 106a) of the first vehicle 100a to which the network circuit 132b is operably coupled. Additionally, the network circuit 132b is configured to determine the electrical configuration (e.g., the first configuration 124, the second configuration 126) of the bus of the third vehicle 100c to which the network circuit 132b is operably coupled. In this example, since the network circuit 132b is coupled to the second network buses 106a, 106c of the first and third vehicles 100a, 100c, and because the second network buses 106a, 106c of the first and third vehicles 100a, 100c have the second electrical configuration 126, the network circuit 132b would determine that the bus (e.g., the second network bus 106a) of the first vehicle 100a to which the network circuit 132b is operably coupled to has the second configuration 126 and therefore is the second bus 106a of the first vehicle 100a, and that the bus (e.g., the second network bus 106c) of the third vehicle 100c to which the network circuit 132b is coupled has the second configuration 126 and therefore is the second network bus 106c of the third vehicle 100c.

Additionally or alternatively, the control subsystems 130a, 130b, 130c are configured to determine whether the adjacent vehicles 100a, 100b, 100c are oriented at the first orientation 120 or the second orientation 122, relative to the vehicle 100a, 100b, 100c in which a network circuit 132a, 132b, 132c is disposed, based on the first electrical configuration 124 or the second electrical configuration 126 that is determined by the network circuit 132a, 132b, 132c. For example, the control subsystem 130b of the second vehicle 100b may be configured to determine that the first vehicle 100a is at the second orientation 122 (relative to the side or end of the second vehicle 100b with which the first network bus 104b of the second vehicle 100b is associated), based on the second network bus 106a being associated with the second orientation 122, and that the third vehicle 100c is at the second orientation 122 (relative to the other side or end of the second vehicle 100b with which the second network bus 106b of the second vehicle 100b is associated), based on the second network bus 106c also being associated with the second orientation 122.

In this manner, when a first vehicle equipped in this fashion is coupled to an adjacent, similarly-equipped vehicle at an unknown orientation (for example, the adjacent vehicle is attached to the rear end of the first vehicle, but it is unknown if the adjacent vehicle is oriented with its front end towards the first vehicle or its rear end towards the first vehicle), the control subsystem of the first vehicle can detect the electrical configuration of the network bus 104 or 106 of the adjacent vehicle to which the first vehicle is coupled, and with the electrical configuration being associated with a particular orientation of the adjacent vehicle, how the adjacent vehicle is oriented relative to the first vehicle.

Figure 5:
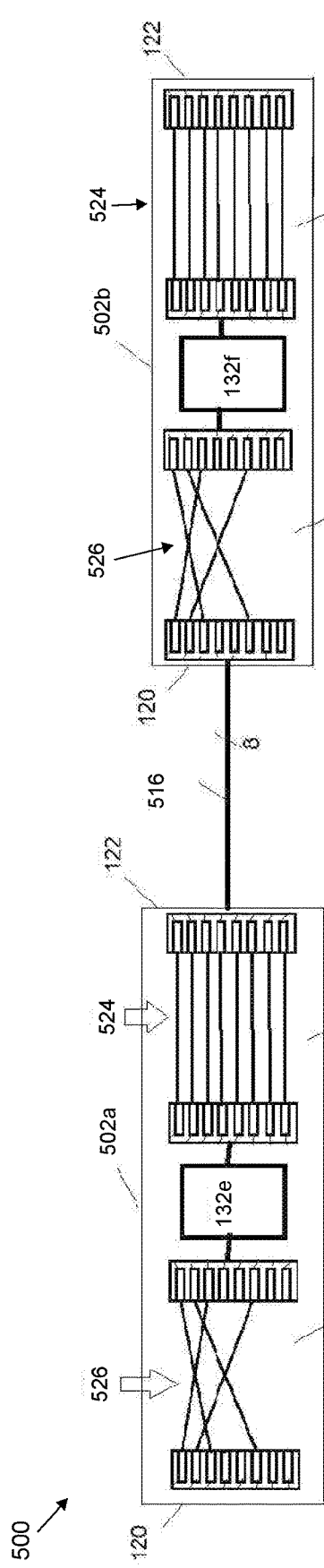
FIGS. 5-7 are schematic diagrams of embodiments of a vehicle network system, in accordance with various embodiments.
Figure 6:
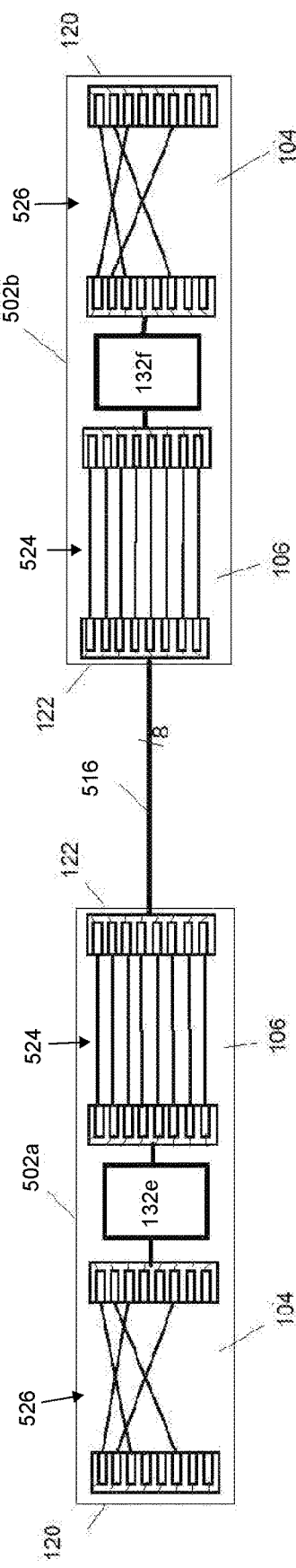
Figure 7:
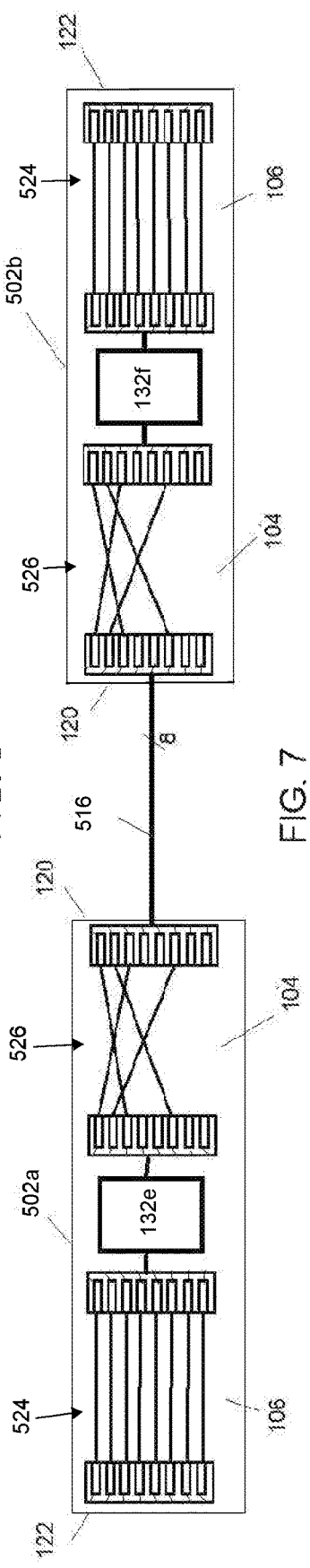

FIGS. 5-7 show embodiments of a vehicle network system 500 where the network buses are implemented as Ethernet buses having straight-through configurations 524 (e.g., the electrical configuration 124) and crossover configurations 526 (e.g., the electrical configuration 126). Specifically, for a plurality of vehicles 502a, 502b in a transportation network, the first network bus 104 of each vehicle 502a, 502b, associated with a first orientation (e.g., side, end, or long hood or short hood forward) 120 of the vehicles 502a, 502b, is an Ethernet bus configured as a crossover configuration 526, and the second network bus 106 of each vehicle 502a, 502b, associated with a second orientation (e.g., other side, other end, or other of the long hood or short hood forward) 122 of the vehicles 502a, 502b, is an Ethernet bus configured as a straight-through configuration 524. The vehicles 502a, 502b may be similar to and/or the same as the vehicle 100 shown in FIG. 1. In each vehicle 502a, 502b, the first and second network buses 104, 106 of the vehicle 502a, 502b are operably coupled to a respective network circuit 132e, 132f. Adjacent vehicles 502a, 502b are detachably coupled for data communications by a detachable Ethernet cable 516. Optionally, the detachable Ethernet cable 516 may be similar to and/or the same as the external network cable 116. The network circuits 132e, 132f may be similar to and/or the same as the network circuit 132 shown in FIG. 1.

In connection with FIG. 5, the first vehicle 502a and the second vehicle 502b are positioned having the same orientation. For example, the second vehicle 502b is positioned such that the first orientation 120 of the vehicle 502b is facing the second orientation 122 of the first vehicle 502a. The second network bus 106 of the first vehicle 502a is coupled to the first network bus 104 of the second vehicle 502b via the detachable Ethernet cable 516. The network circuit 132e of the first vehicle 502a can determine that it is coupled to the first network bus 104 of the second vehicle 502b by detecting that the first network bus 104 has the crossover configuration 526. For example, knowing that the connection is through the second network bus 106 of the first vehicle 502a, the network circuit 132e will detect the network circuit 132e is connected to the first network bus 104 of the second vehicle 502b having the crossover configuration 526 by determining that pin 1 of the second network bus 106 connected to the network circuit 132e is coupled to pin 3 of the network circuit 132f on the second vehicle 502b, and/or that pin 2 of the second network bus 106 is connected to pin 6 of the network circuit 132f on the second vehicle 502b, and/or the like.

In connection with FIG. 6, the first vehicle 502a and the second vehicle 502b are positioned having opposing orientations. For example, the second vehicle 502b is positioned such that the second orientation 122 of the second vehicle 502b is facing the second orientation 122 of the first vehicle 502a. The second network bus 106 of the first vehicle 502a is coupled to the second network bus 106 of the second vehicle 502b via the detachable Ethernet cable 516. The network circuit 132e of the first vehicle 502a can determine that it is coupled to the second network bus 106 of the second vehicle 502b by detecting that the second network bus 106 has the straight-through configuration 524. For example, knowing that the connection is through the second network bus 106 of the first vehicle 502a, the network circuit 132e will detect the network circuit 132e is connected to the second network bus 106 of the second vehicle 502b having the straight through configuration 524 by determining that the pins of at each of the network circuit 132e, 132f match.

In connection with FIG. 7, the orientation of the first vehicle 502a is flipped, with respect to FIGS. 5-6, such that the first vehicle 502a and the second vehicle 502b are positioned having opposing orientations. For example, the second vehicle 502b is positioned such that the first orientation 120 of the second vehicle 502b is facing the first orientation 120 of the first vehicle 502a. The first network bus 104 of the first vehicle 502a is coupled to the first network bus 104 of the second vehicle 502b via the detachable Ethernet cable 516. The network circuit 132e of the first vehicle 502a can determine that it is coupled to the first network bus 104 of the second vehicle 502b by detecting that the first network bus 104 of the second vehicle 502b if the pins as seen at each network circuit 132e, 132f of the two vehicles 502a, 502b match.

Additionally or alternatively, the first vehicle 502a and the second vehicle 502b are positioned having the same orientation. For example, the second vehicle 502b is positioned such that the second orientation 122 of the vehicle 502b is facing the first orientation 120 of the first vehicle 502a. The first network bus 104 of the first vehicle 502a is coupled to the second network bus 106 of the second vehicle 502b via the detachable Ethernet cable 516. The network circuit 132e of the first vehicle 502a can determine that it is coupled to the second network bus 106 of the second vehicle 502b having the straight-through configuration 526 if the pins as seen at each network circuit 132e, 132f of the two vehicles 502a, 502b do not match (e.g., similar to as explained in regard to FIG. 5).

Additionally or alternatively, the external network cable 116 and/or the detachable Ethernet cable 516 that interconnect adjacent vehicles (e.g., 502a and 502b, 100a and 100b, 100b and 100c) all the same and/or have a designated configuration (e.g., straight through, cross over).

It may be noted that although embodiments are described herein wherein the electrical configuration (e.g., the electrical configuration 524, 526) of the network buses 104, 106 include Ethernet straight-through and crossover, in other embodiments the electrical configurations could include different impedances (e.g., impedances that are different by more than a threshold, to avoid variances in impedance measurement), different configurations of crossover, and/or the like.

Another embodiment relates to a method (e.g., a method of vehicle control). The method includes, with a network circuit of a control subsystem of a first vehicle, determining an electrical configuration of a network bus of a second vehicle. The method further includes, with the control subsystem, determining an orientation of the second vehicle relative to the first vehicle based at least in part on the electrical configuration that is determined. The method may further include the control subsystem controlling a vehicle consist that includes the first vehicle and the second vehicle based at least in part on the orientation that is determined.

In another embodiment, a method includes, with a network circuit of a control subsystem of a first vehicle, determining whether an Ethernet bus of a second vehicle is configured in an Ethernet crossover configuration or in an Ethernet straight-through configuration. The method further includes, with the control subsystem, determining an orientation of the second vehicle relative to the first vehicle based at least in part on the Ethernet crossover configuration or the Ethernet straight-through configuration that is determined. The method may further include the control subsystem controlling a vehicle consist that includes the first vehicle and the second vehicle based at least in part on the orientation that is determined.

With Base-T Ethernet, there are two basic cabling types. The first is a straight-through cable, which was originally used to have 10 BaseT devices connect to hubs, where devices already swapped its positive and minus signals in order to communicate. The second is a straight-through cable, which was used when a hub or router needed to communicate with another hub or router, again swapping plus and minus signals in the cable.

With the industry moving towards removing MU cables, one of the issues that is solved to determine if trailing units are long-hood or short-hood forward is by swapping the forward/reverse trainlines in one of the directions. This makes it so the unit just follows the trainline as opposed to locomotive personnel going to each locomotive and setting the direction to correspond with "forward" and "reverse." The current plan to replace MU is to use Ethernet. One method to handle this would be to use a straight-through cable going to one particular end of the locomotive (such as short) or another vehicle and a crossover cable going to one particular end of the locomotive (such as long) or other vehicle. As long as every locomotive ships with whichever method, then the direction can always be known by each trail, corresponding to the lead. This may be done by reading the status over RMII of whether or not MDI-X is performing in a crossover or straight-through fashion. Another method would be to dedicate (and never swap) a particular port on a switch that goes to that particular direction (short or long hood). Then by port there is an understanding of where the traffic is coming from—but if they are swapped then locomotives could pull in the wrong direction—whereas by using the cable method then the only issue that could come up is when the cable itself is replaced (and tested).

In an embodiment, a vehicle includes a chassis, a first network bus, and a second network bus. The first network bus extends from internally in the chassis (e.g., at a location where a network circuit may be connected to the bus) to a first network port attached externally to the chassis. The first network port is positioned in association with a first orientation of the vehicle, e.g., the front end of the vehicle. The second network bus extends from internally in the chassis to a second network port attached externally to the chassis. The second network port is positioned in association with a different, second orientation of the vehicle, e.g., the rear end of the vehicle. The first network bus has a first electrical configuration and the second network bus has a second electrical configuration that is different than the first electrical configuration.

According to an aspect, having different electrical configurations in association with the different orientations allows a control subsystem of an adjacent vehicle, when coupled to the first network bus or the second network bus (e.g., by way of a detachable network cable that extends between the vehicles), to determine how the vehicles are oriented relative to one another. For example, the control subsystem may include a network circuit that is configured to determine the electrical configurations of network buses attached to it. Based on the determined electrical configuration in a given instance, the control subsystem can determine the vehicle orientation.

As one example, the network buses may be Ethernet cables or other Ethernet buses, and the networks ports may be Ethernet ports. (The buses are used, in conjunction with routers, hubs, switches, or other network circuits, to communicate data, e.g., for vehicle control purposes.) One of the Ethernet buses is configured in an Ethernet crossover configuration, and the other is configured in an Ethernet straight-through configuration. Plural vehicles in a transportation system may be similarly configured, for example, in each vehicle an Ethernet crossover bus extends to an Ethernet port at the front or rear of the vehicle, and an Ethernet straight-through bus extends to an Ethernet port at the other of the front or rear of the vehicle. Whenever one vehicle is coupled to an adjacent vehicle for network data communications, the one vehicle can determine which end of the adjacent vehicle is attached to it by determining the presence of the Ethernet crossover bus or the Ethernet straight-through bus.

It is to be understood that the above description is intended to be illustrative, and not restrictive. For example, the above-described embodiments (and/or aspects thereof) may be used in combination with each other. In addition, many modifications may be made to adapt a particular situation or material to the teachings of various embodiments herein without departing from its scope. While the dimensions and types of materials described herein are intended to define the parameters of various embodiments herein, they are by no means limiting and are exemplary embodiments. Many other embodiments will be apparent to those of skill in the art upon reviewing the above description. As used herein, the terms "including" and "in which" are used as the plain-English equivalents of the respective terms "comprising" and "wherein." Moreover, as used herein, the terms "first," "second," and "third," etc. are used merely as labels, and are not intended to impose numerical requirements on their objects.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

As used herein, the terms "module", "system," "device," "unit," or "circuit" may include a hardware and/or software system and circuitry that operates to perform one or more functions. For example, a module, unit, device, circuit, or system may include a computer processor, controller, or other logic-based device that performs operations based on instructions stored on a tangible and non-transitory computer readable storage medium, such as a computer memory. Alternatively, a module, unit, device, circuit, or system may include a hard-wired device that performs operations based on hard-wired logic and circuitry of the device. The modules, units, circuits, or systems shown in the attached figures may represent the hardware and circuitry that operates based on software or hardwired instructions, the software that directs hardware to perform the operations, or a combination thereof. The modules, systems, devices, circuit, or units can include or represent hardware circuits or circuitry that include and/or are connected with one or more processors, such as one or computer microprocessors.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter, including the best mode, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general-purpose signal processor, microcontroller, random access memory, hard disk, or the like). Similarly, the programs may be stand-alone programs, may be incorporated as subroutines in an operating system, may be functions in an installed software package, or the like. The various embodiments are not limited to the arrangements and instrumentality shown in the drawings.

What is claimed is:

1. A system comprising:
a first network bus configured to extend internally in a vehicle chassis to a first network port attached externally to the vehicle chassis at a first side of the vehicle chassis;
a second network bus configured to extend internally in the vehicle chassis to a second network port attached externally to the vehicle chassis at a second side of the vehicle chassis, wherein the first network bus has a first electrical configuration and the second network bus has a second electrical configuration that is different than the first electrical configuration, the first and second electrical configurations corresponding to an arrangement of conductor pins at the first and second network port; and
one or more processors configured to determine an orientation of the vehicle chassis on a route relative to an additional vehicle chassis based on at least one of the first electrical configuration or the second electrical configuration, the one or more processors configured to control at least one of: a first vehicle that includes the vehicle chassis, a second vehicle that includes the additional vehicle chassis, or a device onboard at least one of the first vehicle or the second vehicle based on the orientation that is determined.

2. The system of claim 1, further comprising:
a network circuit configured to attach with the first network port and with the second network port, the network circuit also configured to determine the first electrical configuration after connecting with the first network port and to determine the second electrical configuration after connecting with the second network port.

3. The system of claim 1, wherein the one or more processors are configured to control movement of a vehicle consist that includes the vehicle chassis and the additional vehicle chassis based at least in part on the orientation that is determined.

4. The system of claim 1, further comprising:
a third network bus internally extending in the additional vehicle chassis to a third network port externally attached to the additional vehicle chassis at a first side of the additional vehicle chassis; and
a fourth network bus internally extending in the additional vehicle chassis to a fourth network port externally attached to the additional vehicle chassis at a second side of the additional vehicle chassis,
wherein the third network bus has the first electrical configuration and the second network bus has the second electrical configuration, and
wherein the first network circuit is operably coupled to the third network bus and with the fourth network bus.

5. The system of claim 1, wherein:
the first network bus is a first Ethernet bus and the first electrical configuration is an Ethernet crossover configuration,
the second network bus is a second Ethernet bus and the second electrical configuration is an Ethernet straight-through configuration, and
the first and second network ports are respective Ethernet ports.

6. The system of claim 5, wherein the first Ethernet bus is a first Ethernet cable having the crossover configuration, and the second Ethernet bus is a second Ethernet cable having the straight-through configuration.

7. The system of claim 1, wherein the first side is a first end of the vehicle chassis and the second side is an opposite second end of the vehicle chassis.

8. The system of claim 1, wherein the vehicle chassis is associated with a rail vehicle, the first end is a long hood forward end of the rail vehicle, and the second end is a short hood forward end of the rail vehicle.

9. The system of claim 1, wherein the one or more processors are configured to control a motoring direction of at least one of the first vehicle or the second vehicle based on the orientation that is determined.

10. The system of claim 9, wherein the one or more processors are configured to ensure that the first vehicle and the second vehicle are moving in a common direction by controlling the motoring direction.

11. A method comprising:
determining an electrical configuration of one or more of a first network port or a second network port, the first network port externally attached to a first side of a vehicle chassis and connected with a first network bus inside the vehicle chassis, the second network port externally attached to a second side of the vehicle chassis and connected with a second network bus inside the vehicle chassis, the first and second network ports having different electrical configurations;
determining an orientation of the vehicle chassis on a route based on the electrical configuration that is determined; and
controlling operation of one or more of a first vehicle that includes the vehicle chassis, a second vehicle, or a device onboard at least one of the first vehicle or the second vehicle based on the orientation that is determined.

12. The method of claim 11, wherein the electrical configuration is determined by attaching a network circuit with the first network port or with the second network port.

13. The method of claim 11, wherein the one or more processors are configured to control movement of a vehicle consist that includes the vehicle chassis and the additional vehicle chassis based at least in part on the orientation that is determined.

14. The method of claim 11, wherein the operation that is controlled is a motoring direction of at least one of the first vehicle or the second vehicle based on the orientation that is determined.

15. The method of claim 14, wherein the motoring direction is controlled to ensure that the first vehicle and the second vehicle are moving in a common direction.

16. A system comprising:
a network circuit configured to couple with a first network port disposed at a first end of a first vehicle and to couple with a different, second network port disposed at a different, second end of the first vehicle, the first network port having a different arrangement of electrical conductors than the second network port; and
one or more processors configured to communicate with the network circuit to determine whether the network circuit is coupled with the first network port or the second network port based on the arrangement of the electrical conductors with which the network circuit is coupled,
wherein the one or more processors are configured to determine an orientation of the first vehicle relative to a second vehicle based on the arrangement of the electrical conductors to which the network circuit is coupled.

17. The system of claim 16, wherein the one or more processors are configured to control a motoring direction of the first vehicle based on the arrangement of the electrical conductors to which the network circuit is coupled.

18. The system of claim 17, wherein the one or more processors are configured to control the motoring direction of the first vehicle to be a common direction with a motoring direction of the second vehicle.

19. The system of claim 16, wherein the first network port is an Ethernet port having a crossover configuration of the electrical conductors and the second network port is another Ethernet port having a straight-through configuration of the electrical conductors.

20. The system of claim 16, wherein the network circuit includes pins that engage one or more of the electrical conductors in each of the first network port and the second network port, and wherein the one or more processors are configured to determine the arrangement of the electrical conductors in the first network port or in the second network port based on which of the pins engage which of the one or more electrical conductors in the first network port or the second network port.

* * * * *